(12) United States Patent
Yen et al.

(10) Patent No.: US 12,298,812 B2
(45) Date of Patent: May 13, 2025

(54) RETRACTABLE SCREEN MOBILE DEVICE

(71) Applicant: SYNCMOLD ENTERPRISE CORP., New Taipei (TW)

(72) Inventors: Ching-Hui Yen, New Taipei (TW); Chun-Hao Huang, New Taipei (TW)

(73) Assignee: SYNCMOLD ENTERPRISE CORP., New Taipei (TW)

(*) Notice: Subject to any disclaimer, the term of this patent is extended or adjusted under 35 U.S.C. 154(b) by 196 days.

(21) Appl. No.: 18/181,369

(22) Filed: Mar. 9, 2023

(65) Prior Publication Data

US 2023/0341903 A1    Oct. 26, 2023

Related U.S. Application Data

(60) Provisional application No. 63/333,714, filed on Apr. 22, 2022.

(30) Foreign Application Priority Data

Dec. 5, 2022  (TW) .................................. 111146550

(51) Int. Cl.
*G06F 1/16*    (2006.01)
*F16M 11/04*   (2006.01)
*F16M 13/00*   (2006.01)

(52) U.S. Cl.
CPC .......... *G06F 1/1652* (2013.01); *G06F 1/1624* (2013.01); *F16M 11/045* (2013.01); *F16M 13/005* (2013.01)

(58) Field of Classification Search
CPC ... G06F 1/1624; G06F 1/1652; F16M 11/045; F16M 13/005; H04M 1/0237; H04M 1/0268; G09F 9/301
See application file for complete search history.

(56) References Cited

U.S. PATENT DOCUMENTS

| | | | |
|---|---|---|---|
| 10,747,269 B1 * | 8/2020 | Choi ..................... | G06F 1/1641 |
| 2020/0329572 A1 | 10/2020 | Wittenberg et al. | |
| 2021/0218835 A1 | 7/2021 | Song et al. | |
| 2022/0021759 A1 | 1/2022 | Lim et al. | |
| 2022/0418125 A1 * | 12/2022 | Li .......................... | G06F 1/1652 |

FOREIGN PATENT DOCUMENTS

| | | |
|---|---|---|
| CN | 210629557 U | 5/2020 |
| CN | 214504835 U | 10/2021 |
| WO | WO-2022/014904 A1 | 1/2022 |

* cited by examiner

*Primary Examiner* — Imani N Hayman
*Assistant Examiner* — Logan F McGowan
(74) *Attorney, Agent, or Firm* — Muncy, Geissler, Olds & Lowe, P.C.

(57) ABSTRACT

A retractable screen mobile device comprises a main unit, a movable unit, at least one elastic member, a flexible display screen, and at least one constant force spring. When the movable unit is in a retracted state, the flexible display screen is supported by a first supporting surface of the main unit; when the movable unit is in an outstretched state, the flexible display screen is supported by the first supporting surface of the main unit and a second supporting surface of the movable unit.

15 Claims, 15 Drawing Sheets

RETRACTABLE SCREEN MOBILE DEVICE

CROSS REFERENCE TO RELATED APPLICATION

This application claims the benefit of U.S. Provisional Application Ser. No. 63/333,714 filed on Apr. 22, 2022, and the benefit of Taiwan Patent Application Serial No. 111146550 filed on Dec. 5, 2022. The entirety of each Application is incorporated herein by reference.

BACKGROUND OF THE INVENTION

1. Field of the Invention

The present invention relates to a retractable screen mobile device, particularly to a retractable screen mobile device for flexible display screen.

2. Description of Related Art

Conventional mobile devices often focus on the requirements of portability, lightness, and thinness. As a result, the size of the display screen of the mobile device is limited. However, with the development of mobile devices, users' demand for large-size display screens has increased rapidly. Therefore, many related products that can expand the size of the display screen have been published in recent years, that is, the display screen area can be increased when the mobile device is used but still meet the requirements of light and thin when the mobile device is carried and stored.

However, during the transition between the unfolded and retracted states of the foldable flexible display screen, the tensile stress or the material fatigue may easily lead to creases, damages, or cracks in the flexible display screen.

Therefore, a main objective of the present invention is to provide a mobile device with a retractable display screen, which can be selectively switched between the outstretched and retracted states according to the needs during use.

SUMMARY OF THE INVENTION

An objective of the present invention is to provide a retractable screen mobile device. The retractable screen mobile device comprises a main unit, a movable unit, at least one elastic member, a flexible display screen, and at least one constant force spring. The main unit includes a first shell, a first supporting element, and an accommodating space, wherein the first supporting element is disposed on the first shell and has a first supporting surface, and the accommodating space is surrounded and defined by the first shell and the first supporting element. The movable unit is slidably disposed on the main unit along a telescopic axis and being capable of converting between a retracted state and an outstretched state with respect to the main unit. The moveable unit includes a frame, a pivot shaft, at least one hook, a second supporting element, a steering shaft, and a moving plate, wherein the pivot shaft is disposed on one side of the frame away from the first shell, the at least one hook is pivotally hung on the pivot shaft, the second supporting element is pivotally connected to the at least one hook and has a second supporting surface, the second supporting element is able to switch between a lower position and an aligned position with respect to the pivot shaft, the steering shaft is connected to the frame and accommodated in the accommodating space, and the moving plate partially covers the first shell. The at least one elastic member with two ends respectively disposed on the first shell and the moving plate, and tends to keep the movable unit in either the retracted state or the outstretched state. The flexible display screen includes a first end and a second end, wherein the first end is disposed on the first supporting element and the second end is fixed to the first shell, and wherein the flexible display screen covers the first supporting surface, winds around the pivot shaft to change direction, and winds around the steering shaft to change direction again. The at least one constant force spring includes a winding part and a telescopic part, wherein the winding part is disposed on the first shell, and the telescopic part is disposed on the frame for constantly providing a pulling force on the frame, so that the steering shaft disposed on the frame constantly tightens the flexible display screen. The pivot shaft and the first shell are closest to each other when the movable unit is in the retracted state, and the pivot shaft and the first shell are farthest away from each other when the movable unit is in the outstretched state.

In one embodiment, when the movable unit is in the retracted state, the second supporting element is in the lower position, partially accommodated in the accommodating space and partially overlapped with the first supporting element, the first supporting surface and the second supporting surface are not coplanar, and the flexible display screen is mainly supported by the first supporting surface. When the movable unit is in the outstretched state, the second supporting element is in the aligned position, the first supporting element and the second supporting element do not overlap to each other, the first supporting surface and the second supporting surface are substantially coplanar, and the flexible display screen is jointly supported by the first supporting surface and the second supporting surface.

In one embodiment, the movable unit further includes at least one compression spring, which is disposed on the frame and abuts against the second supporting element, and provides a supporting force on the second supporting element. The at least one compression spring makes the second supporting element tend to approach the first supporting element when the movable unit is in the retracted state The at least one compression spring supports the second supporting element and makes the first supporting element and the second supporting element be coplanar to jointly support the flexible display screen when the movable unit is in the outstretched state.

In one embodiment, the flexible display screen winds with a Z-shaped section, and has a display area, a first inward area, and a second inward area, wherein the display area is located between the first end of the flexible display screen and the pivot shaft, the first inward area is located between the pivot shaft and the steering shaft, and the second inward area is located between the steering shaft and the second end of the flexible display screen. When the movable unit changes from the retracted state to the outstretched state with respect to the main unit, an area of the display area gradually increases, an area of the first inward area remains unchanged, and an area of the second inward area gradually decreases.

In one embodiment, the second supporting element includes a main plate, two wing plates, two abutting parts, and at least one pivot part, wherein the wing plates are disposed respectively on both sides of the main plate and fixed on the frame, and the abutting parts are respectively disposed on the wing plates, opposite to and substantially parallel to the main plate, and are abutted by the at least one compression spring. The second supporting element is pivotally connected to the at least one hook.

In one embodiment, the first supporting element further has a first inner surface and a first inclined surface, wherein the first inner surface is opposite to the first supporting surface, and the first inclined surface connects the first supporting surface and the first inner surface. The second supporting element further has a second inner surface and a second inclined surface, wherein the second inner surface is opposite to the second supporting surface, and the second inclined surface connects the second supporting surface and the second inner surface. The first inclined surface and the second inclined surface are matched and substantially abutted against with each other when the movable unit is in the outstretched state.

In one embodiment, a first inner acute angle is formed between the first supporting surface and the first inclined surface, a first inner obtuse angle is formed between the first inner surface and the first inclined surface, a second inner obtuse angle is formed between the second supporting surface and the second inclined surface, and a second inner acute angle is formed between the second inner surface and the second inclined surface.

In one embodiment, the first shell includes a main body and a fixing plate. The fixing plate is disposed on the main body and has at least one displacement guide body The at least one displacement guide body has a first positioning section, a panning section, a lifting section, and a second positioning section in sequence. The second supporting element further includes at least one moving guide, which is disposed on the wing plates corresponding to the at least one displacement guide body and abuts against the at least one displacement guide body. When the movable unit is in the retracted state, the at least one moving guide is positioned at the first positioning section. When the movable unit is moved out of the retracted state, the at least one moving guide slides along the panning section. When the movable unit is converted from the retracted state to the outstretched state, the at least one moving guide slides from the panning section to the lifting section for lifting the second supporting element until the at least one moving guide is positioned at the second positioning section, and the movable unit is in the outstretched state.

In one embodiment, the movable unit further includes two guide pieces, each of the wing plates has a guide groove, and the guide pieces respectively slide in the corresponding guide grooves.

In one embodiment, the second end of the flexible display screen is fixed on the fixing plate. When the movable unit is in the outstretched state, the display area is supported by the first supporting surface and the second supporting surface and is partially wound around the pivot shaft. When the movable unit is in the retracted state, the display area is supported by the first supporting surface and is partially wound around the pivot shaft. When the movable unit is in either the retracted state or the outstretched state, the first inward area and the second inward area are accommodated in the accommodating space.

In one embodiment, the moving plate has a cover and a sliding part, the fixing plate has at least one hollow part and a fixing portion, the at least one elastic member is accommodated in the at least one hollow part and has a first end part and a second end part, the first end part is disposed on the fixing portion, and the second end part is disposed on the sliding part. When the movable unit is in the retracted state, the second end part is located away from the pivot shaft relative to the first end part, and tends to push the sliding part away from the pivot shaft thus to remain in the retracted state. When the movable unit is in the outstretched state, the second end part is located closer to the pivot shaft relative to the first end part, and tends to push the sliding part towards the pivot shaft thus to remain in the outstretched state.

In one embodiment, the sliding part further has at least one sliding protrusion, the fixing plate further has at least one sliding groove extending along the telescopic axis. The at least one sliding protrusion corresponds to and engages with the at least one sliding groove. When the movable unit moves relative to the main unit, the at least one sliding protrusion moves along the at least one sliding groove.

In one embodiment, the pivot shaft is a damping shaft, which provides a damping force when the movable unit moves relative to the main unit.

In one embodiment, the damping shaft has a hollow outer tube, an inner tube, a filling area, a damping oil, and two oil seals. The inner tube passes through the hollow outer tube and two ends of the inner tube are respectively fixed on the frame. The hollow outer tube rotates relative to the inner tube. The filling area is formed between the hollow outer tube and the inner tube. The damping oil is filled in the filling area. The oil seals are respectively disposed on both ends of the filling area to seal the damping oil in the filling area.

In one embodiment, the pivot shaft has a rod body and at least one hook recess. The rod body is disposed along a steering axis that is substantially perpendicular to the telescopic axis. The at least one hook recess is formed on the rod body for the at least one hook part hanging thereon.

DETAILED DESCRIPTION OF THE PREFERRED EMBODIMENT

Figure 1:
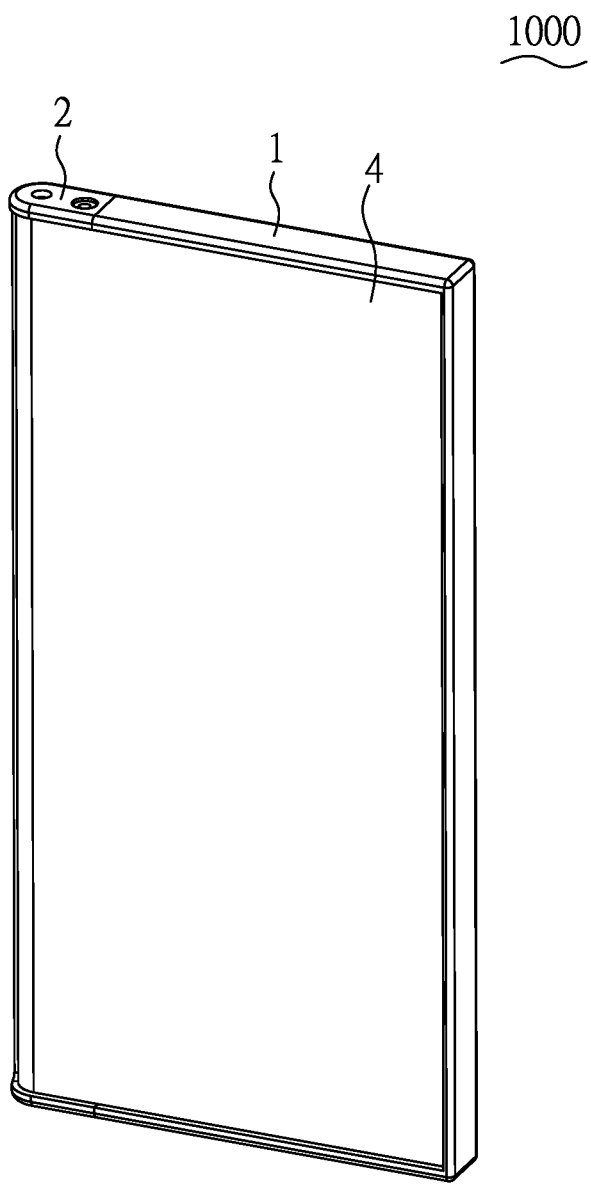
FIG. 1 is a schematic view of the retractable screen mobile device in the retracted state according to the present invention.

Reference will now be made in detail to the present embodiments of the invention, examples of which are illustrated in the accompanying drawings, and are not intended to limit the present invention, applications or implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 2:
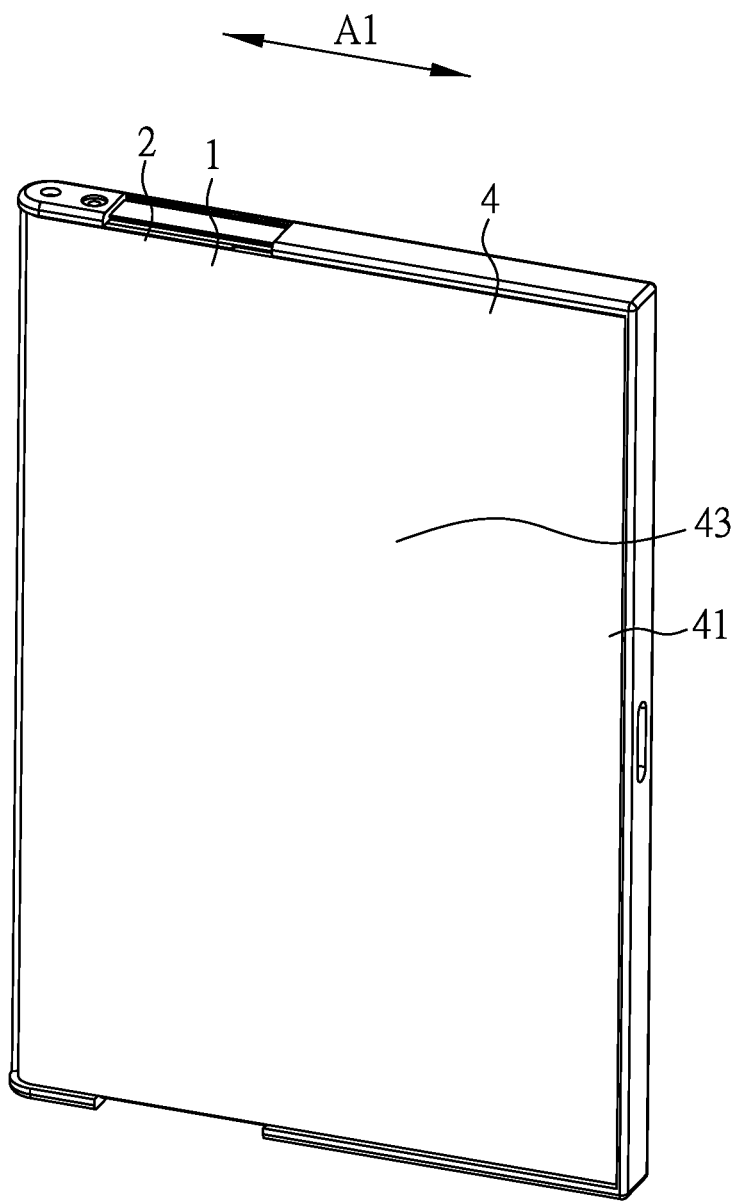
FIG. 2 is a schematic view of the retractable screen mobile device in the outstretched state according to the present invention.
Figure 3:
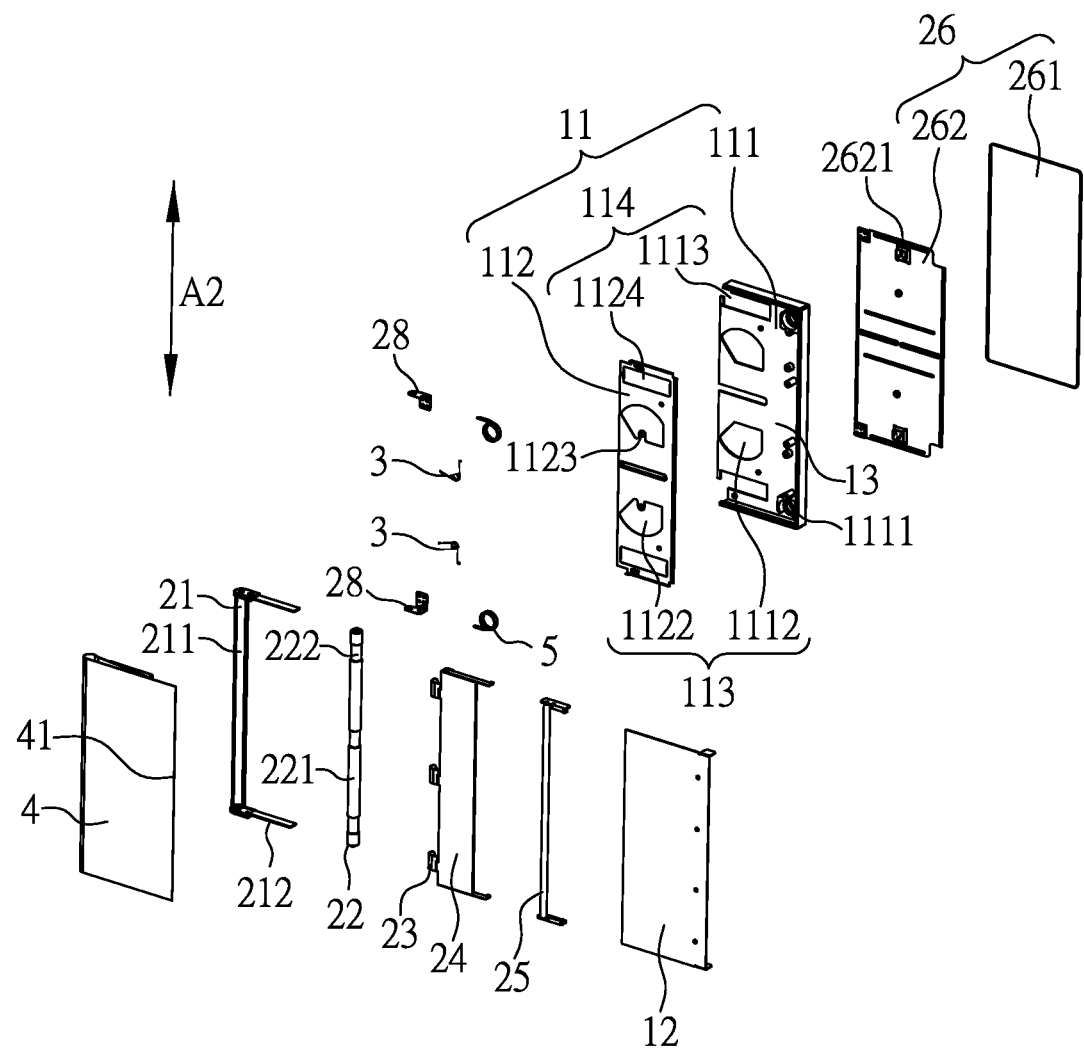
FIG. 3 is an exploded view of the retractable screen mobile device according to the present invention.
Figure 4:
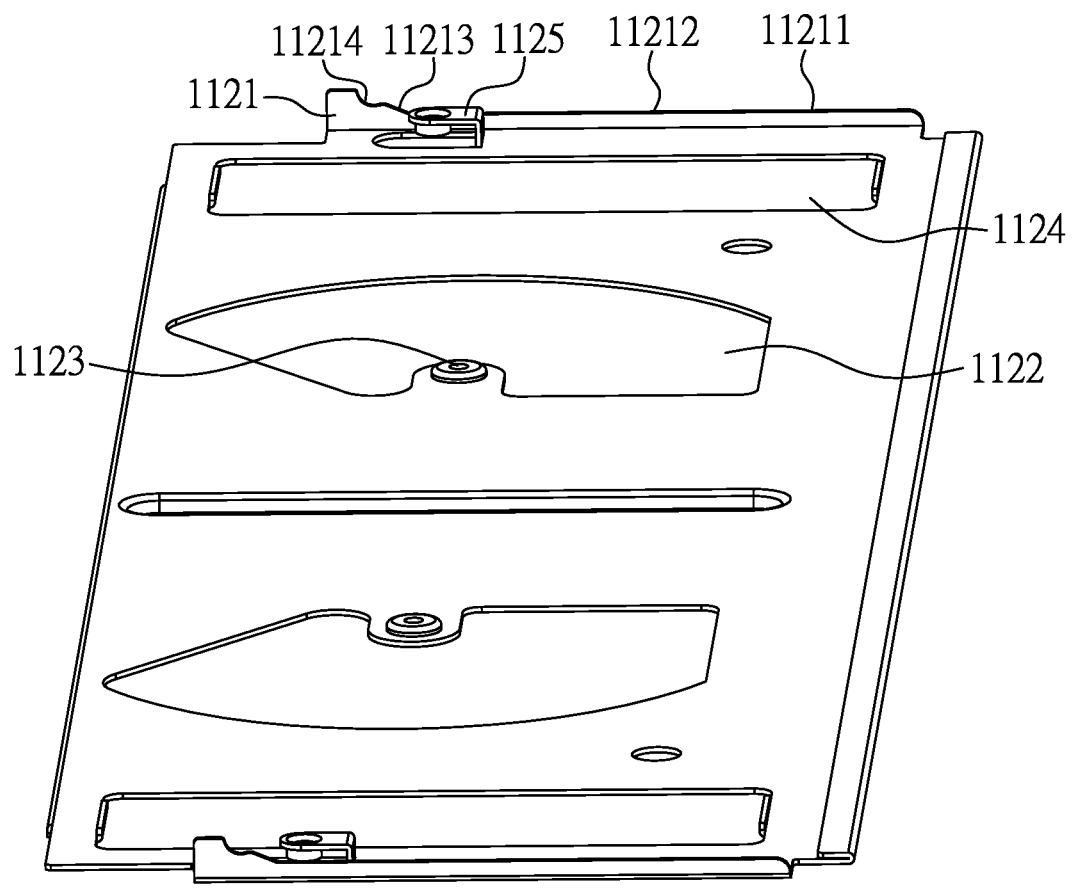
FIG. 4 is a schematic view of the fixing plate according to the present invention.

The present invention relates to a retractable screen mobile device 1000 as shown in FIGS. 1 and 2 in a retracted state and an outstretched state, respectively, and in an exploded view in FIG. 3. The retractable screen mobile device 1000 primarily comprises a main unit 1, a movable unit 2, two elastic members 3, a flexible display screen 4, and two constant force springs 5. Referring to FIG. 4, the main unit 1 comprises a first shell 11, a first supporting element 12, and an accommodating space 13. The first supporting element 12 is roughly plate-shaped and is disposed on the first shell 11 and surrounds the accommodating space 13 in conjunction with the first shell 11. The first shell 11 comprises a main body 111, a fixing plate 112, two hollow parts 113, and two sliding grooves 114. The main body 111 has two bases 1111, two first hollow areas 1112, and two first sliding areas 1113. The fixing plate 112 is disposed on the main body 111 and has two interspaced displacement guide bodies 1121, two second hollow areas 1122, two fixing portions 1123, two second sliding areas 1124, and two locking portions 1125. Each displacement guide body 1121 has a first positioning section 11211, a panning section 11212, a lifting section 11213, and a second positioning section 11214 in sequence. The first hollow area 1112 and the second hollow area 1122 correspond to each other and overlap to form the hollow parts 113. The first sliding area 1113 and the second sliding area 1124 correspond to each other and overlap to form the sliding groove 114. The locking portion 1125 fixes one end of the flexible display screen 4.

Figure 5:
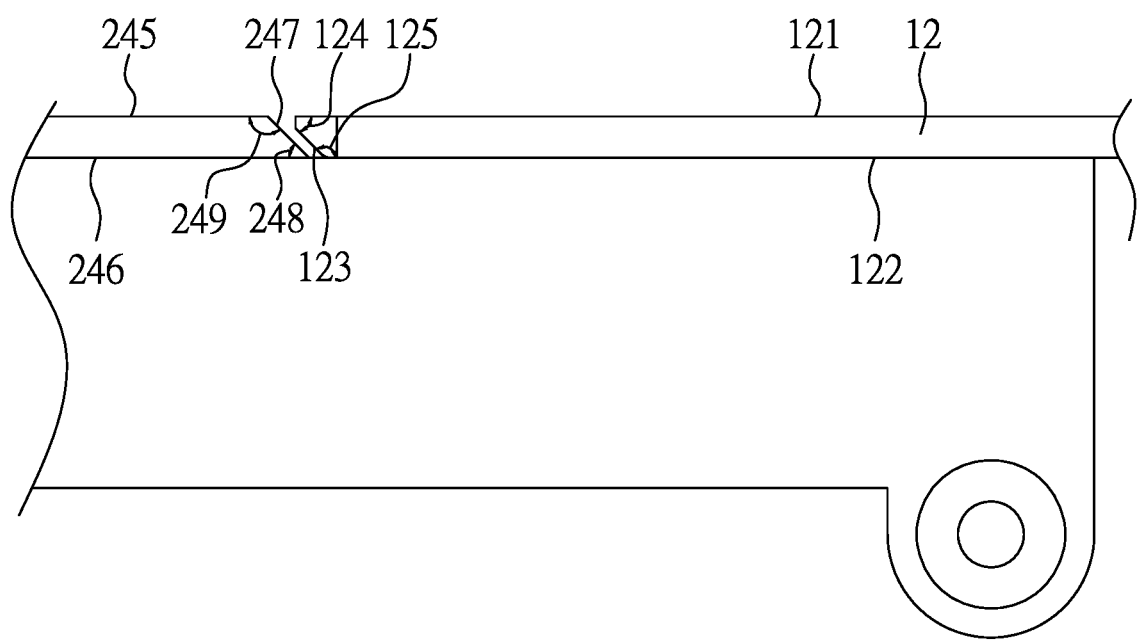
FIG. 5 is a partial enlarged view of the first supporting element and the second supporting element according to the present invention.

In detail, referring to the enlarged portion of the first supporting element 12 shown in FIG. 5, the first supporting element 12 has a first supporting surface 121, a first inner surface 122, a first inclined surface 123, a first inner acute angle 124, and a first inner obtuse angle 125. The first inclined surface 123 connects the first supporting surface 121 and the first inner surface 122, and the first inner acute angle 124 is formed between the first supporting surface 121 and the first inclined surface 123, and the first inner obtuse angle 125 is formed between the first inner surface 122 and the first inclined surface 123.

Additionally, the main unit 1 also includes a panel body (not shown in the figure) electrically connected to the flexible display screen 4, i.e. a module of electronic components such as a circuit board or battery, to provide corresponding functions for the mobile device. Further details are not discussed here.

The movable unit 2 is disposed on the main unit 1 and can be outstretched and retracted relative to the main unit 1 along a telescopic axis A1 between a retracted state (FIG. 1) and an outstretched state (FIG. 2).

In detail, as shown in FIG. 3, the movable unit 2 includes a frame 21, a pivot shaft 22, three hooks 23, a second supporting element 24, a steering shaft 25, a moving plate 26, two compression springs 27 (referring to FIG. 10), and two guide pieces 28. The frame 21 has an arc-shaped panel 211 and two sliding side panels 212. The arc-shaped panel 211 is disposed on one side away from the first shell 11 and the sliding side panels 212 are correspondingly disposed at both ends of the arc-shaped panel 211 (i.e., they form a U-shape together), and the pivot shaft 22 is pivotally connected to it. The pivot shaft 22 is a damping shaft, with both ends pivotally disposed on the sliding side panels 212 correspondingly, away from the first shell 11, and having a rod body 221 and three hook recesses 222. The rod body 221 is disposed along a steering axis A2 which is substantially perpendicular to the telescopic axis A1.

Figure 6:
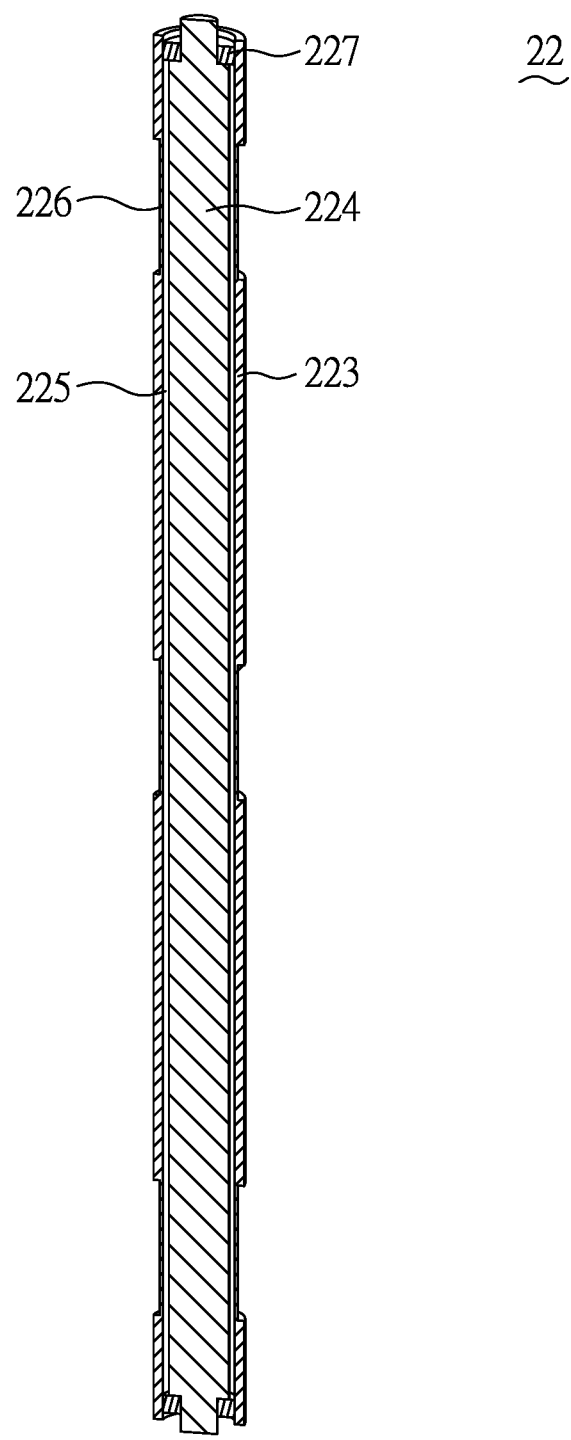
FIG. 6 is a sectional view of the pivot shaft according to the present invention.

According to the cross-sectional view of the pivot shaft 22 shown in FIG. 6, the pivot shaft 22 has a hollow outer tube 223, an inner tube 224, a filling area 225, a damping oil 226, and two oil seals 227. The inner tube 224 is inserted into the hollow outer tube 223, and the two ends of the inner tube 224 are fixed to the frame 21. The hollow outer tube 223 and the inner tube 224 can rotate relative to each other. The filling area 225 is formed between the hollow outer tube 223 and the inner tube 224, and the damping oil 226 is filled in the filling area 225. The oil seals 227 are respectively set at both ends of the filling area 225 to seal the damping oil 226 in the filling area 225. When the hollow outer tube 223 rotates relative to the inner tube 224, the damping oil 226 provides a damping force.

The hooks 23 are pivotally connected to the second supporting element 24 and are correspondingly hung on the three hook recesses 222 of the pivot shaft 22 respectively to pivot relative to the pivot shaft 22.

Figure 7:
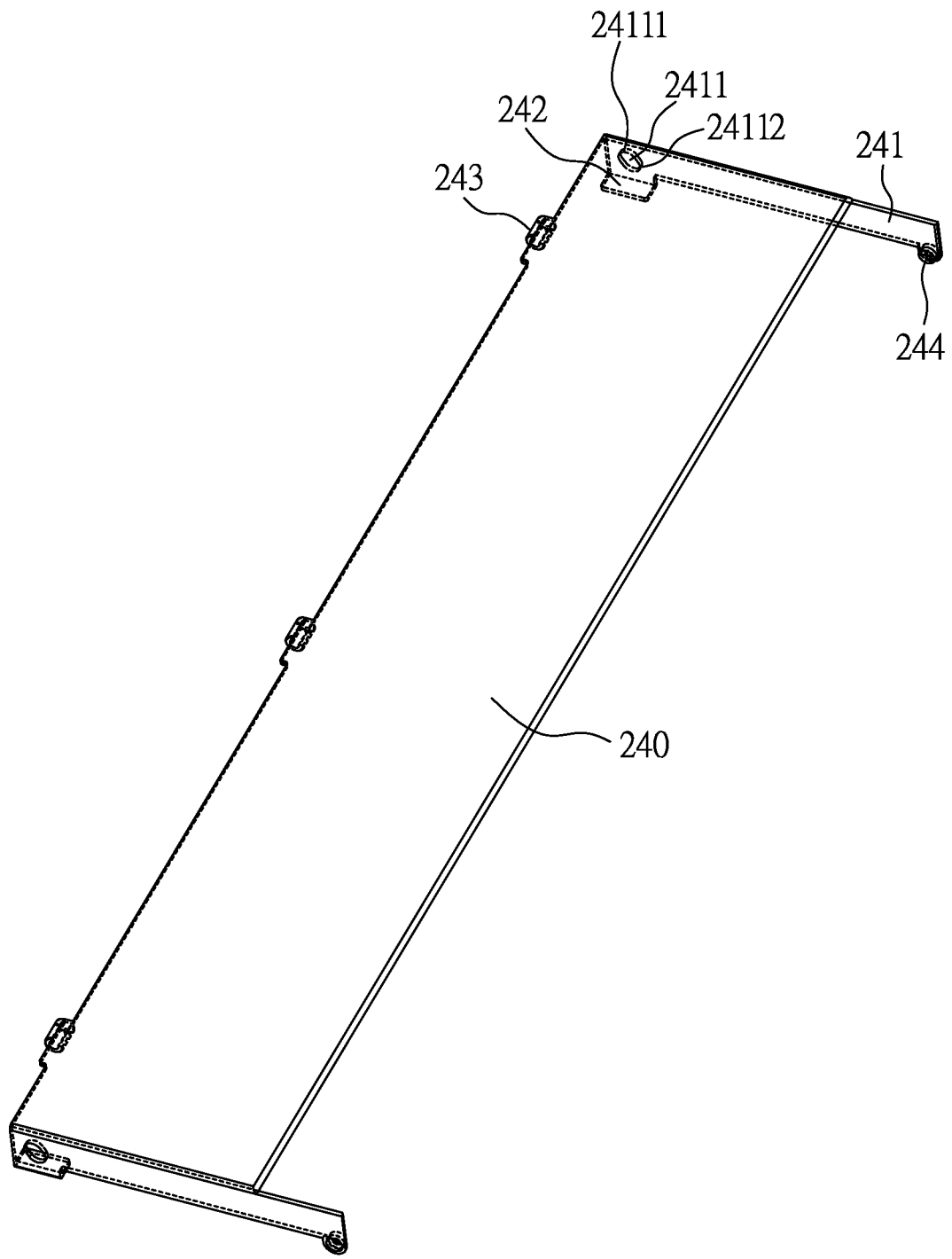
FIG. 7 is a schematic view of the second supporting element according to the present invention.
Figure 8:
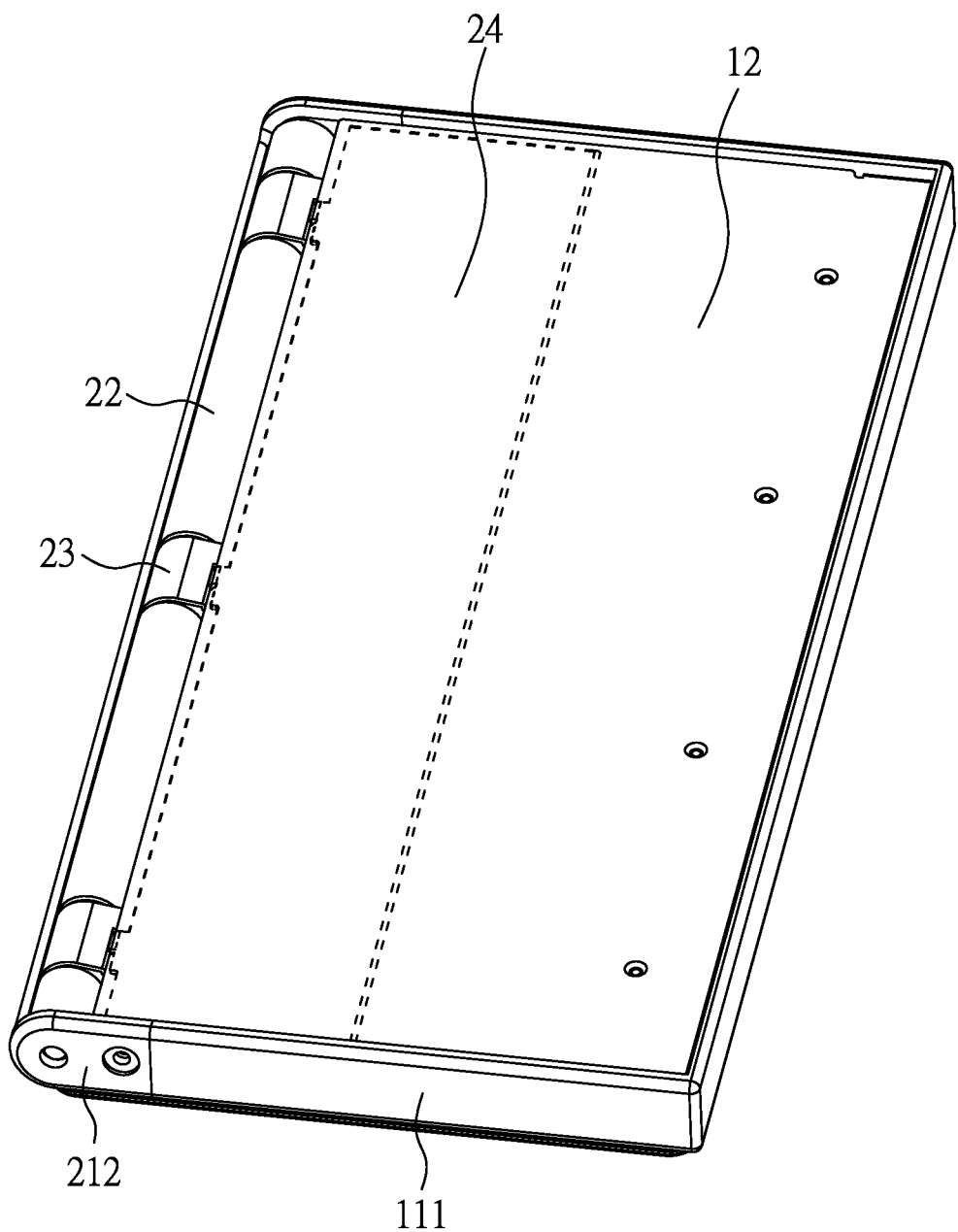
FIG. 8 is a schematic view of the second supporting element in the lower position according to the present invention.
Figure 9:
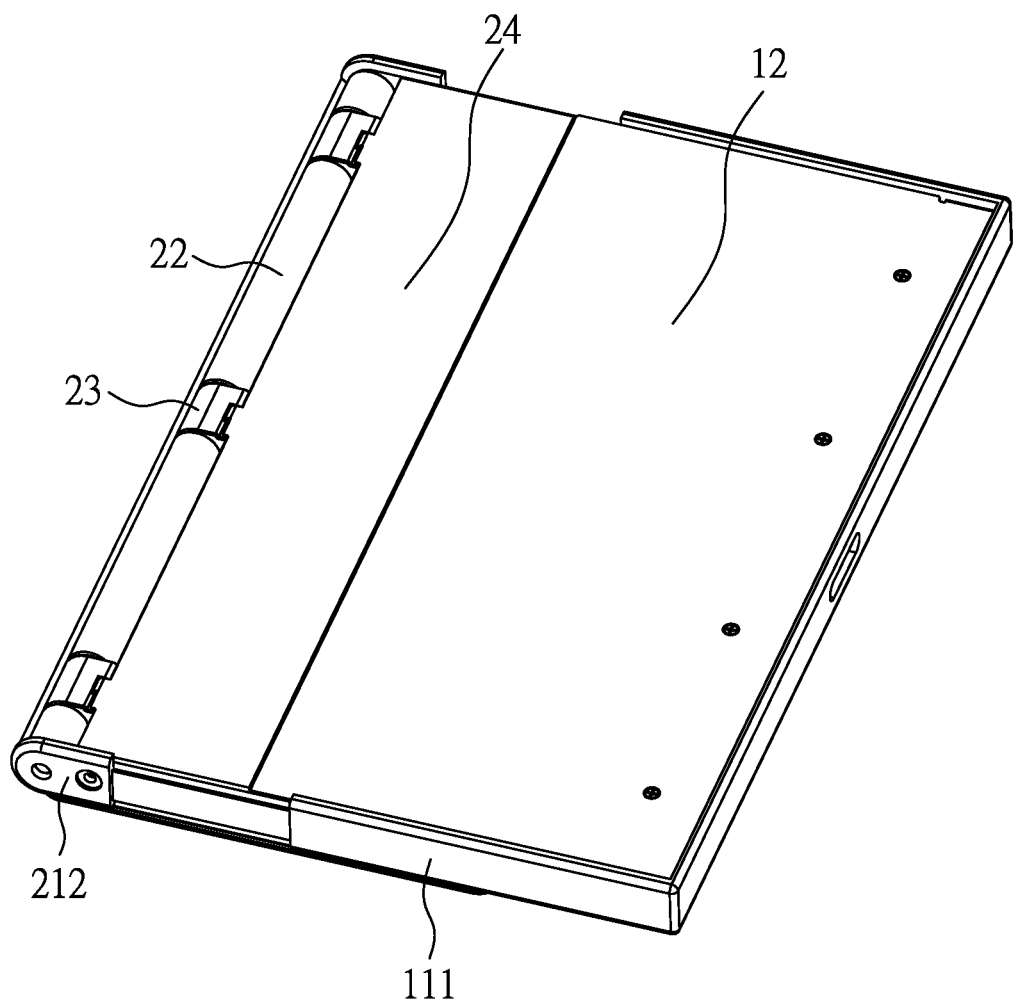
FIG. 9 is a schematic view of the second supporting element in the aligned position according to the present invention.

Refer to FIG. 5 (partially enlarged view) and FIG. 7 (three-dimensional illustration) for more details. The second supporting element 24 has a main plate 240, two wing plates 241, two abutting parts 242, three pivot parts 243, a moving guide 244, a second supporting surface 245, a second inner surface 246, a second inclined surface 247, a second inner acute angle 248, and a second inner obtuse angle 249. The second supporting element 24 is hung on the pivot shaft 22 via the hooks 23 and can pivot relative to the hooks 23. It can pivot between a lower position (FIG. 8) and an aligned position (FIG. 9).

The wing plates 241 are respectively arranged on both sides of the main plate 240 and extend perpendicular to the main plate 240. They are fixed to the frame 21 and each has a guide groove 2411. The abutting parts 242 are respectively arranged on the side of the wing plates 241 adjacent to each other and extend substantially parallel to the main plate 240, and abut against the compression spring 27. The second supporting element 24 is connected to the hooks 23 through the pivot parts 243.

Figure 10:
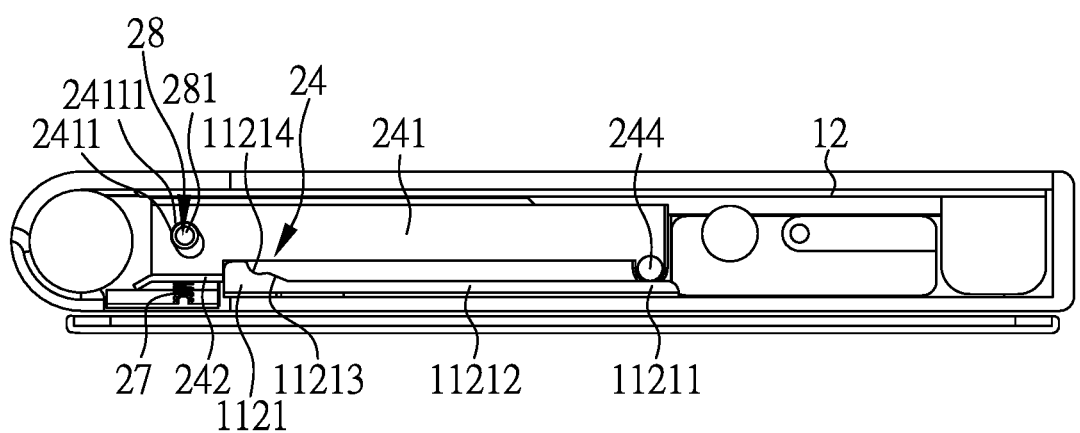
FIG. 10 is a sectional view of the movable unit in the retracted state according to the present invention.
Figure 11:
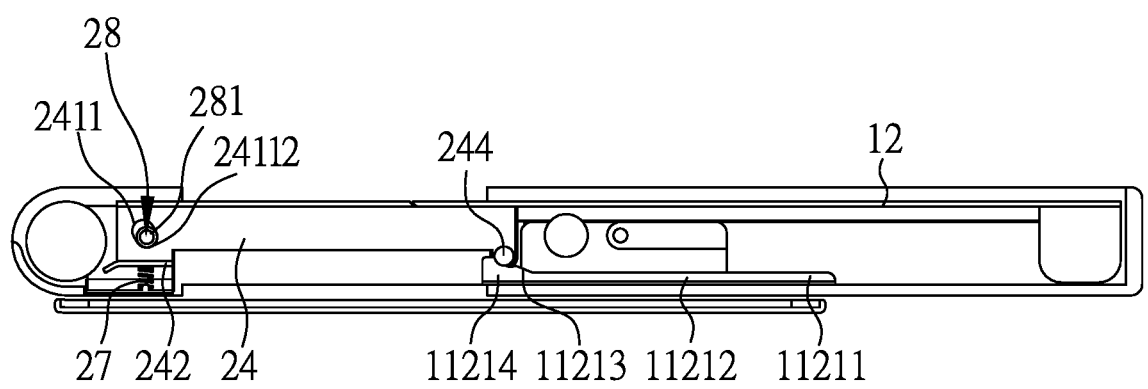
FIG. 11 is a sectional view of the movable unit in the outstretched state according to the present invention.

Specifically, the moving guide 244 is disposed on the wing plate 241 corresponding to the displacement guide body 1121 on the first shell 11 and abuts against the displacement guide body 1121. As shown in FIG. 10, the moving guide 244, for example, is a roller, when the movable unit 2 is in the retracted state, the moving guide 244 is located in the first positioning section 11211, causing the second supporting element 24 to be positioned at the lower position. When the movable unit 2 is moved out of the retracted state, the moving guide 244 slides along the panning section 11212. When the movable unit 2 departs from the retracted state and switches to the outstretched state, the moving guide 244 slides from the panning section 11212 to the lifting section 11213 to lift the second supporting element 24, until the moving guide 244 is positioned in the second positioning section 11214, the second supporting element 24 switches to the aligned position as shown in FIG. 11, with the movable unit 2 in the outstretched state.

Furthermore, referring to FIG. 5, the second inner surface 246 is opposite to the second supporting surface 245, the second inclined surface 247 connects the second supporting surface 245 and the second inner surface 246, and there is a second inner obtuse angle 249 formed between the second supporting surface 245 and the second inclined surface 247, and a second inner acute angle 248 formed between the second inner surface 246 and the second inclined surface 247. The first inner acute angle 124 and the second inner obtuse angle 249 are complementary, and the first inner obtuse angle 125 and the second inner acute angle 248 are complementary. As a result, the transformation between the second supporting element 24 in the lower position and the aligned position can be smoother.

The steering shaft 25 is connected at both ends to the frame 21 and disposed within the accommodating space 13, with the moving plate 26 partially covering the first shell 11.

Figure 12:
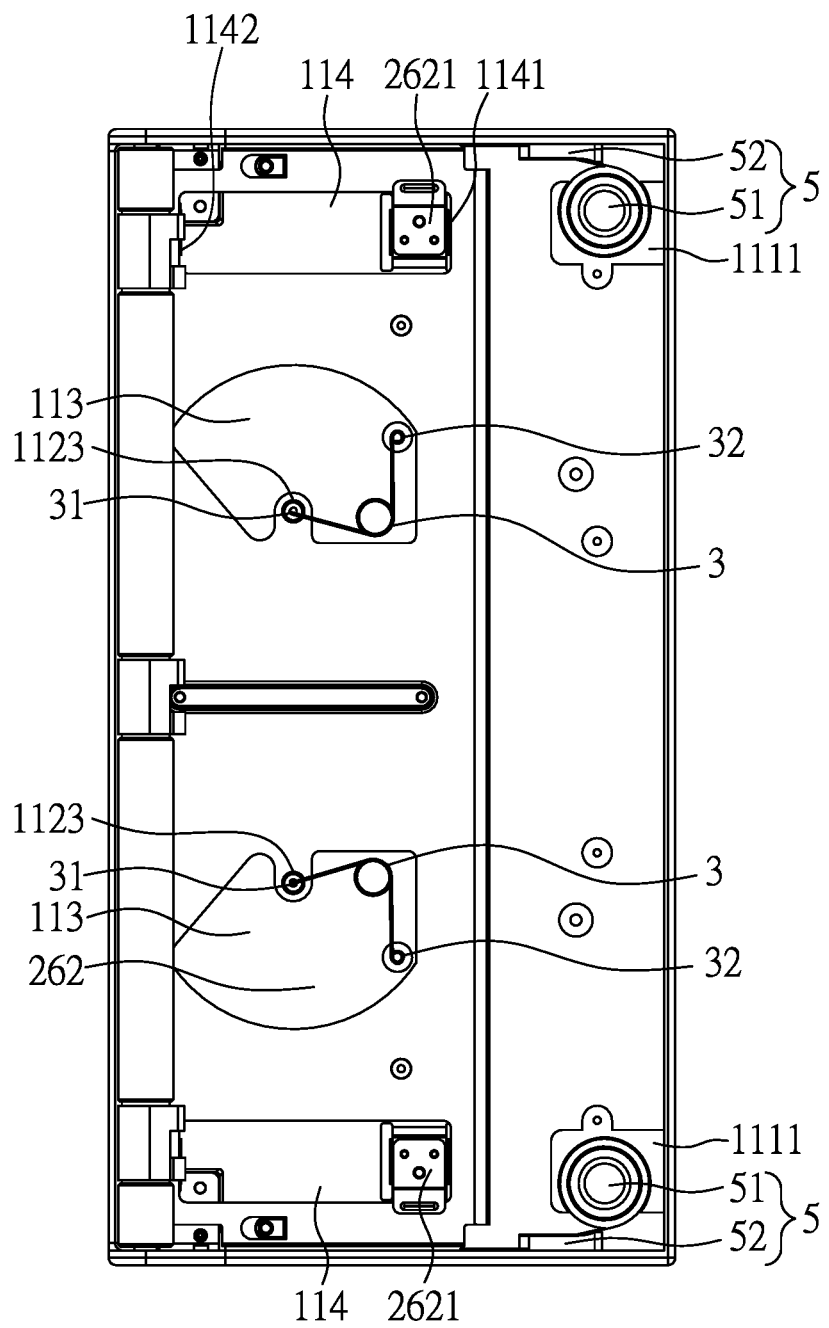
FIG. 12 is a schematic view of the movable unit in the retracted state according to the present invention.

Specifically, the moving plate 26 has a cover 261 and a sliding part 262. The sliding part 262 further has two sliding protrusions 2621, respectively corresponding to and engaging with the sliding grooves 114 of the first shell 11. When the movable unit 2 moves relative to the main unit 1, the sliding protrusions 2621 move along the sliding grooves 114. As shown in FIG. 12, when the movable unit 2 is in the retracted state, the sliding protrusions 2621 are respectively located at a first stopping end 1141 of the sliding grooves 114, and as shown in FIG. 13, when the movable unit 2 is switched to the outstretched state, the sliding protrusions 2621 are respectively located at a second stopping end 1142 of the sliding grooves 114.

Figure 15:
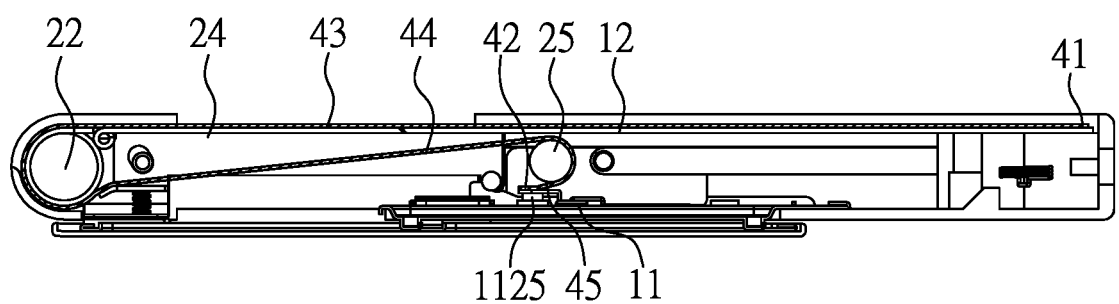
FIG. 15 is a sectional view of the movable unit in the outstretched state according to the present invention.

The compression spring 27 is disposed on the frame 21 and abuts against the abutting part 242 of the second supporting element 24. The compression spring 27 continuously provides support to the second supporting element 24. As shown in FIG. 10, in the retracted state, the compression spring 27 causes the second supporting element 24 to be inclined towards the first supporting element 12. As shown in FIG. 11, in the outstretched state, the compression spring 27 supports the second supporting element 24 (i.e., the compression spring 27 continuously tends to provide upward support) and maintains the second supporting element 24 in a plane with the first supporting element 12, together supporting the flexible display screen 4 (FIG. 15).

Referring to FIGS. 10 and 11, the guide pieces 28 are disposed on the moving plate 26 and each has a guide post 281. The guide post 281 corresponds to the guide groove 2411 and can slide within the guide groove 2411. As shown in FIG. 10, when the second supporting element 24 is at the lower position, the guide post 281 is at the first end portion 24111 of the guide groove 2411, and as shown in FIG. 11, when the second supporting element 24 is at the aligned position, the guide post 281 is at the second end portion 24112 of the guide groove 2411, in order to restrict the movement path of the second supporting element 24 during conversion between the lower position and the aligned position, and to ensure that the second supporting element 24 will not exceed the aligned position due to the upward support force provided by the compression spring 27.

Figure 13:
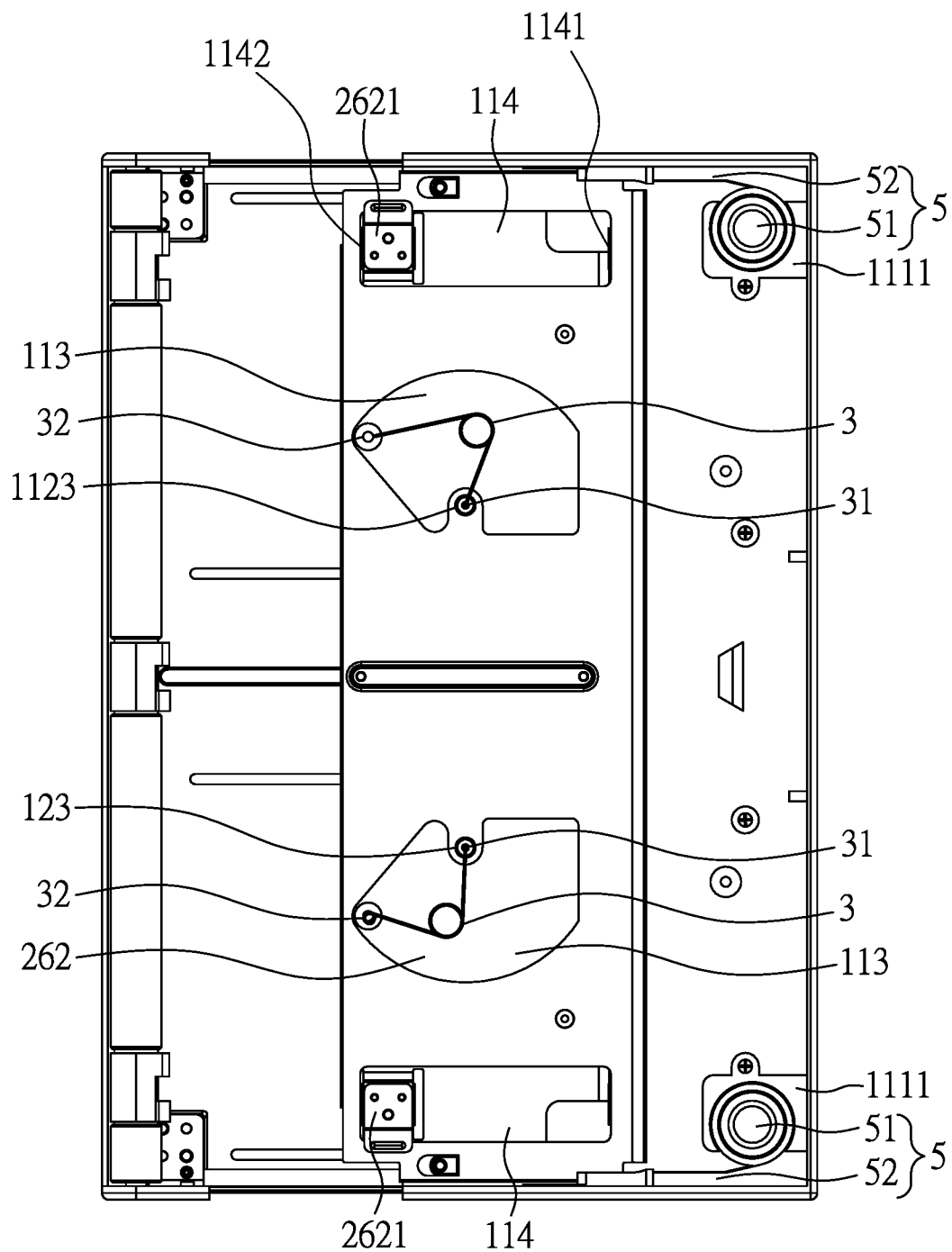
FIG. 13 is a schematic view of the movable unit in the outstretched state according to the present invention.

Referring to FIG. 12 and FIG. 13, the elastic member 3 is a torsion spring, which comprises a first end part 31 and a second end part 32. The elastic members 3 are disposed in the hollow parts 113. The first end part 31 is fixed to the fixing portion 1123 of the first shell 11 of the main unit 1. The second end part 32 is fixed to the sliding part 262 of the moving plate 26 of the movable unit 2. The elastic members 3 can assist the movable unit 2 to convert between the retracted state and the outstretched state.

As shown in FIG. 12, when the movable unit 2 is in the retracted state, the elastic member 3 tends to cause the movable unit 2 to remain in the retracted state. However, when it is desired to convert to the outstretched state, an external force is required to push the movable unit 2 and overcome the elasticity provided by the elastic member 3, causing the movable unit 2 to depart from the retracted state and gradually move away from the main unit 1. After the movable unit 2 moves a certain distance relative to the main unit 1, the elastic member 3 provides the elasticity to bring the movable unit 2 to the outstretched state, as shown in FIG. 13, and causes the movable unit 2 to tend to remain in the outstretched state. Further, during the conversion between the retracted state and the outstretched state, the first end part 31 is fixed to the fixing portion 1123, so it is relatively immovable, while the second end part 32 is attached to the sliding part 262. In the retracted state shown in FIG. 12, the second end part 32 is located on one side (i.e., the right side) of the first end part 31, distant from the pivot shaft 22, and tends to push the sliding part 262 away from the pivot shaft 22, thus tending to remain in the retracted state. In the outstretched state shown in FIG. 13, the second end part 32 is relative to the first end part 31 near one side (i.e. the left side) of the pivot shaft 22, and tends to push the sliding part 262 towards the pivot shaft 22, thus tending to maintain in the outstretched state. In other embodiments, the elastic member 3 may each be a serpentine spring, which may provide the same effect.

Figure 14:
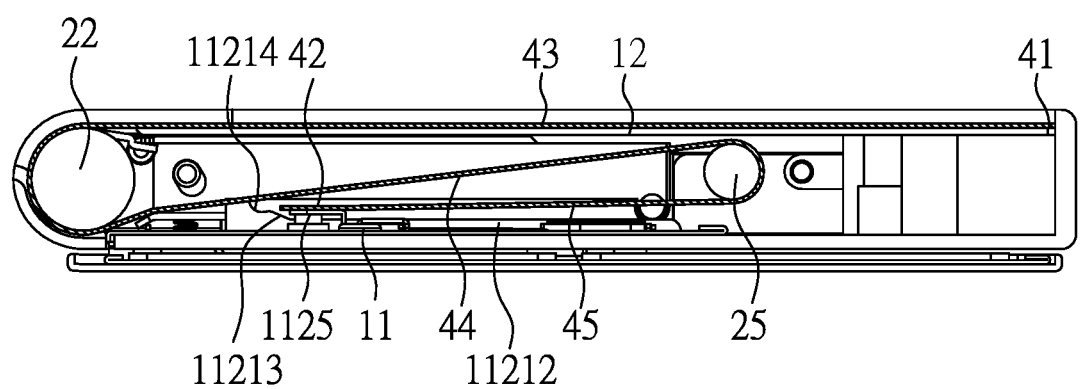
FIG. 14 is a sectional view of the movable unit in the retracted state according to the present invention.

Reference is made to FIG. 14 and FIG. 15. The flexible display screen 4 includes a first end 41, a second end 42, a display area 43, a first inward area 44, and a second inward area 45. The first end 41 is positioned on the first supporting element 12, and the flexible display screen 4 covers the first supporting surface 121 and deflects (changes direction) around the pivot shaft 22 and deflects (changes direction) again around the steering shaft 25, while the second end 42 is fixed on the locking portion 1125 of the first shell 11, so the flexible display screen 4 winds and presents a roughly Z-shaped mirror cross-section (from the other side view of FIG. 14, it is a Z-shaped cross-section). Specifically, the display area 43 is between the first end 41 of the flexible display screen 4 and the pivot shaft 22, the first inward area 44 is between the pivot shaft 22 and the steering shaft 25, and the second inward area 45 is between the steering shaft 25 and the second end 42 of the flexible display screen 4. When the movable unit 2 changes from the retracted state (FIG. 14) to the outstretched state (FIG. 15) relative to the main unit 1, the flexible display screen 4 undergoes dynamic changes, but the area of the first inward area 44 remains unchanged, while the area of the display area 43 gradually increases and the area of the second inward area 45 gradually decreases (approximately, the increase in the area of the display area 43 is equal to the decrease in the area of the second inward area 45). Conversely, when the movable unit 2 changes from the outstretched state (FIG. 15) to the retracted state (FIG. 14) relative to the main unit 1, the area of the first inward area 44 remains unchanged, while the area of the display area 43 gradually decreases and the area of the second inward area 45 gradually increases.

In other words, in the outstretched state, the display area 43 is supported by the first supporting surface 121 and the second supporting surface 245 and partially wrapped around the pivot shaft 22, and in the retracted state, the display area 43 is supported by the first supporting surface 121 and partially wrapped around the pivot shaft 22. In both the retracted state and the outstretched state, the first inward area 44 and the second inward area 45 are constantly accommodated within the accommodating space 13.

As shown in FIG. 12 and FIG. 13, the constant force spring 5 each includes a winding part 51 and a telescopic part 52. The winding part 51 is located on the base 1111 of the first shell 11, and the telescopic part 52 is fixed on the frame 21 for constantly providing the frame 21 with a tension force in the direction towards the first shell 11 along the telescopic axis A1, so that the steering shaft 25 located on the frame 21 constantly tightens the flexible display screen 4.

Specifically, as shown in FIGS. 1, 8, 10, 12, 14, when the movable unit 2 is in its retracted state, the pivot shaft 22 is closest to the first shell 11, the second supporting element 24 is located at its lower position and is disposed in the accommodating space 13, partially overlapping with the first supporting element 12. At this time, the first supporting surface 121 and the second supporting surface 245 are not coplanar and the flexible display screen 4 is primarily supported by the first supporting surface 121. Furthermore, when the second supporting element 24 is at its lower position, the moving guide 244 is located in the first positioning section 11211 and the compression spring 27 are compressed by the second supporting element 24, and the area of the display area 43 of the flexible display screen 4 is minimized, and the area of the second inward area 45 is maximized. Additionally, as shown in FIG. 12, when the movable unit 2 is in its retracted state, the sliding protrusions 2621 is located at the first stopping end 1141 of the sliding grooves 114 and the elastic members 3 are compressed and disposed in the hollow parts 113.

When converting the movable unit 2 from its retracted state to its outstretched state as illustrated in FIGS. 2, 9, 11, 13, and 15 for increasing the display area of the flexible display screen 4, the user can apply an external force to the movable unit 2 to cause it to depart from its retracted state. The elastic member 3 provides elasticity, allowing the movable unit 2 to gradually move along the telescopic axis A1. As the movable unit 2 moves away from the first shell 11 along the telescopic axis A1, the moving guide 244 of the second supporting element 24 moves along the panning section 11212, and the steering shaft 25 gradually moves away from the first end 41 of the flexible display screen 4 and towards the second end 42, thus increasing the display area 43 and decreasing the second inward area 45 while maintaining the first inward area 44 unchanged. The telescopic part 52 of the constant force spring 5 is stretched as the steering shaft 25 gradually moves away, providing a pulling force that tightens the flexible display screen 4. The sliding protrusion 2621 slides in the sliding groove 114 from the first stopping end 1141 to the second stopping end 1142.

Subsequently, when the moving guide 244 moves from the panning section 11212 to the lifting section 11213 and then to the second positioning section 11214, the second supporting element 24 is lifted, and at the same time, the compression spring 27 provides an elastic force to the second supporting element 24, causing the second supporting element 24 to slightly pivot around the pivot shaft 22, so that the second supporting element 24 is aligned with the first supporting element 12, as shown in FIG. 15, with the second supporting surface 245 and the first supporting surface 121 forming a common plane and supporting the display area 43 of flexible display screen 4. At this time, the area of the display area 43 of the flexible display screen 4 is at its maximum, and the area of the second inward area 45 is at its minimum. Furthermore, as shown in FIG. 13, when the movable unit 2 is in the outstretched state, the sliding protrusion 2621 is located at the second stopping end 1142 of the sliding groove 114.

Furthermore, since the pivot shaft 22 is a damping shaft, when the movable unit 2 slides reciprocally relative to the main unit 1, the pivot shaft 22 provides a damping force to prevent the movement of the movable unit 2 relative to the main unit 1 from being too fast, resulting in damage to the components, and provides a harmonious and smooth operation for the user to enhance the product quality and value. However, the pivot shaft 22 is not limited to a damping shaft and can also be a non-damping shaft. Additionally, if the pivot shaft 22 is a non-damping shaft, a damping rod (not shown in the figure) may be provided along the telescopic axis A1 to abut between the first shell 11 and the frame 21 to provide a damping effect.

Although the present invention has been described in considerable detail with reference to certain embodiments thereof, other embodiments are possible. Therefore, the spirit and scope of the appended claims should not be limited to the description of the embodiments contained herein.

What is claimed is:

1. A retractable screen mobile device, comprising:
   a main unit including a first shell, a first supporting element, and an accommodating space, wherein the first supporting element is disposed on the first shell and has a first supporting surface, and the accommodating space is surrounded and defined by the first shell and the first supporting element;
   a movable unit slidably disposed on the main unit along a telescopic axis and being capable of converting between a retracted state and an outstretched state with respect to the main unit, wherein the movable unit includes a frame, a pivot shaft, at least one hook, a second supporting element, a steering shaft, and a moving plate, and wherein the pivot shaft is disposed on one side of the frame away from the first shell, the at least one hook is pivotally hung on the pivot shaft, the second supporting element is pivotally connected to the at least one hook and has a second supporting surface, the second supporting element is able to switch between a lower position and an aligned position with respect to the pivot shaft, the steering shaft is connected to the frame and accommodated in the accommodating space, and the moving plate partially covers the first shell;
   at least one elastic member with two ends respectively disposed on the first shell and the moving plate, and tends to keep the movable unit in either the retracted state or the outstretched state;
   a flexible display screen including a first end and a second end, wherein the first end is disposed on the first supporting element and the second end is fixed to the first shell, and wherein the flexible display screen covers the first supporting surface, winds around the pivot shaft to change direction, and winds around the steering shaft to change direction again; and
   at least one constant force spring including a winding part and a telescopic part, wherein the winding part is disposed on the first shell, and the telescopic part is disposed on the frame for constantly providing a pulling force on the frame, so that the steering shaft disposed on the frame constantly tightens the flexible display screen;

wherein the pivot shaft and the first shell are closest to each other when the movable unit is in the retracted state, and the pivot shaft and the first shell are farthest away from each other when the movable unit is in the outstretched state.

2. The retractable screen mobile device as claimed in claim 1, wherein when the movable unit is in the retracted state, the second supporting element is in the lower position, partially accommodated in the accommodating space and partially overlapped with the first supporting element, the first supporting surface and the second supporting surface are not coplanar, and the flexible display screen is supported by the first supporting surface, and wherein when the movable unit is in the outstretched state, the second supporting element is in the aligned position, the first supporting element and the second supporting element do not overlap to each other, the first supporting surface and the second supporting surface are substantially coplanar, and the flexible display screen is jointly supported by the first supporting surface and the second supporting surface.

3. The retractable screen mobile device as claimed in claim 2, wherein the movable unit further includes at least one compression spring, which is disposed on the frame and abuts against the second supporting element, and provides a supporting force on the second supporting element, and wherein the at least one compression spring makes the second supporting element tend to approach the first supporting element when the movable unit is in the retracted state, and the at least one compression spring supports the second supporting element and makes the first supporting element and the second supporting element be coplanar to jointly support the flexible display screen when the movable unit is in the outstretched state.

4. The retractable screen mobile device as claimed in claim 3, wherein the flexible display screen winds with a Z-shaped section, and has a display area, a first inward area, and a second inward area, wherein the display area is located between the first end of the flexible display screen and the pivot shaft, the first inward area is located between the pivot shaft and the steering shaft, and the second inward area is located between the steering shaft and the second end of the flexible display screen, and wherein when the movable unit changes from the retracted state to the outstretched state with respect to the main unit, an area of the display area gradually increases, an area of the first inward area remains unchanged, and an area of the second inward area gradually decreases.

5. The retractable screen mobile device as claimed in claim 4, wherein the second supporting element includes a main plate, two wing plates, two abutting parts, and at least one pivot part, wherein the wing plates are disposed respectively on both sides of the main plate and fixed on the frame, and the abutting parts are respectively disposed on the wing plates, opposite to and substantially parallel to the main plate, and are abutted by the at least one compression spring, and wherein the second supporting element is pivotally connected to the at least one hook.

6. The retractable screen mobile device as claimed in claim 5, wherein the first supporting element further has a first inner surface and a first inclined surface, in which the first inner surface is opposite to the first supporting surface, and the first inclined surface connects the first supporting surface and the first inner surface, wherein the second supporting element further has a second inner surface and a second inclined surface, in which the second inner surface is opposite to the second supporting surface, and the second inclined surface connects the second supporting surface and the second inner surface, and wherein the first inclined surface and the second inclined surface are matched and substantially abutted against with each other when the movable unit is in the outstretched state.

7. The retractable screen mobile device as claimed in claim 6, wherein a first inner acute angle is formed between the first supporting surface and the first inclined surface, a first inner obtuse angle is formed between the first inner surface and the first inclined surface, a second inner obtuse angle is formed between the second supporting surface and the second inclined surface, and a second inner acute angle is formed between the second inner surface and the second inclined surface.

8. The retractable screen mobile device as claimed in claim 5, wherein the first shell includes a main body and a fixing plate, the fixing plate is disposed on the main body and has at least one displacement guide body, the at least one displacement guide body has a first positioning section, a panning section, a lifting section, and a second positioning section in sequence, wherein the second supporting element further includes at least one moving guide, which is disposed on the wing plates corresponding to the at least one displacement guide body and abuts against the at least one displacement guide body, and wherein when the movable unit is in the retracted state, the at least one moving guide is positioned at the first positioning section, when the movable unit is moved out of the retracted state, the at least one moving guide slides along the panning section, when the movable unit is converted from the retracted state to the outstretched state, the at least one moving guide slides from the panning section to the lifting section for lifting the second supporting element until the at least one moving guide is positioned at the second positioning section, and the movable unit is in the outstretched state.

9. The retractable screen mobile device as claimed in claim 8, wherein the movable unit further includes two guide pieces, each of the wing plates has a guide groove, and the guide pieces respectively slide in the guide grooves.

10. The retractable screen mobile device as claimed in claim 9, wherein the second end of the flexible display screen is fixed on the fixing plate, wherein when the movable unit is in the outstretched state, the display area is supported by the first supporting surface and the second supporting surface and is partially wound around the pivot shaft, when the movable unit is in the retracted state, the display area is supported by the first supporting surface and is partially wound around the pivot shaft, and wherein when the movable unit is in either the retracted state or the outstretched state, the first inward area and the second inward area are accommodated in the accommodating space.

11. The retractable screen mobile device as claimed in claim 10, wherein the moving plate has a cover and a sliding part, the fixing plate has at least one hollow part and a fixing portion, the at least one elastic member is accommodated in the at least one hollow part and has a first end part and a second end part, the first end part is disposed on the fixing portion, and the second end part is disposed on the sliding part, and wherein when the movable unit is in the retracted state, the second end part is located away from the pivot shaft relative to the first end part, and tends to push the sliding part away from the pivot shaft thus to remain in the retracted state, and when the movable unit is in the outstretched state, the second end part is located closer to the pivot shaft relative to the first end part, and tends to push the sliding part towards the pivot shaft thus to remain in the outstretched state.

12. The retractable screen mobile device as claimed in claim 11, wherein the sliding part further has at least one sliding protrusion, the fixing plate further has at least one sliding groove extending along the telescopic axis, the at least one sliding protrusion corresponds to and engages with the at least one sliding groove, and when the movable unit moves relative to the main unit, the at least one sliding protrusion moves along the at least one sliding groove.

13. The retractable screen mobile device as claimed in claim 1, wherein the pivot shaft is a damping shaft, which provides a damping force when the movable unit moves relative to the main unit.

14. The retractable screen mobile device claimed as in claim 13, wherein the damping shaft has a hollow outer tube, an inner tube, a filling area, a damping oil, and two oil seals, and wherein the inner tube passes through the hollow outer tube and two ends of the inner tube are respectively fixed on the frame, the hollow outer tube rotates relative to the inner tube, the filling area is formed between the hollow outer tube and the inner tube, the damping oil is filled in the filling area, and the oil seals are respectively disposed on both ends of the filling area to seal the damping oil in the filling area.

15. The retractable screen mobile device as claimed in claim 14, wherein the pivot shaft has a rod body and at least one hook recess, the rod body is disposed along a steering axis that is substantially perpendicular to the telescopic axis, and the at least one hook recess is formed on the rod body for the at least one hook part hanging thereon correspondingly.

\* \* \* \* \*